Oct. 6, 1942.  G. C. HARBISON  2,298,052
REFRIGERATOR
Filed Jan. 29, 1941
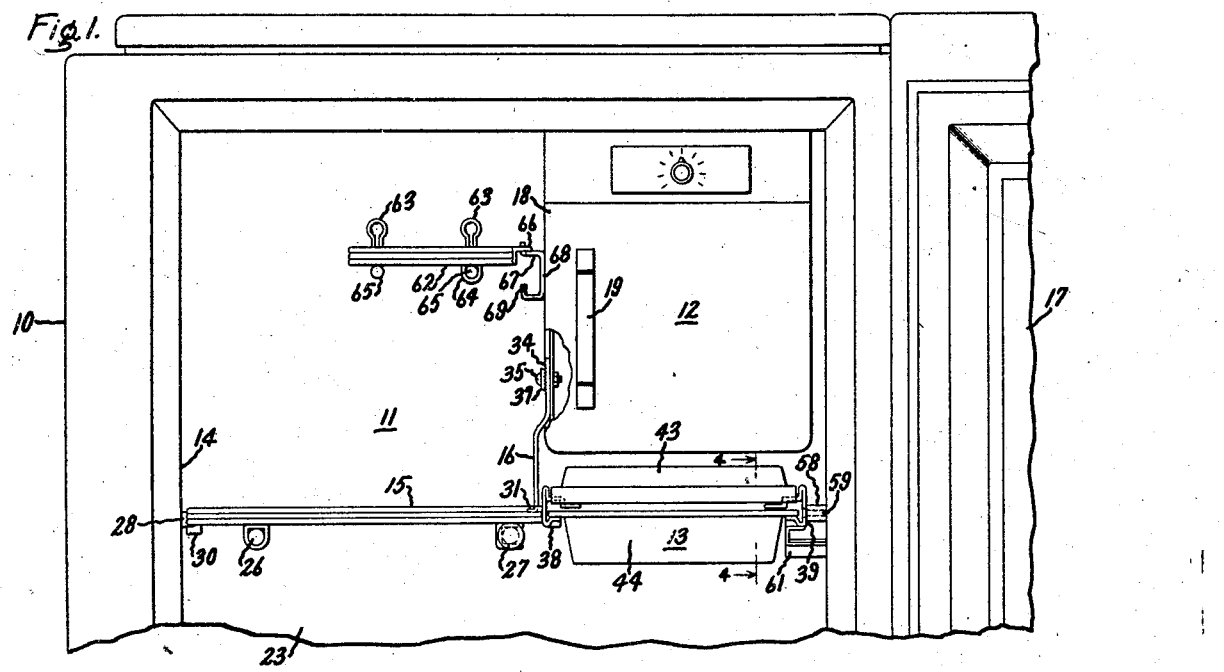
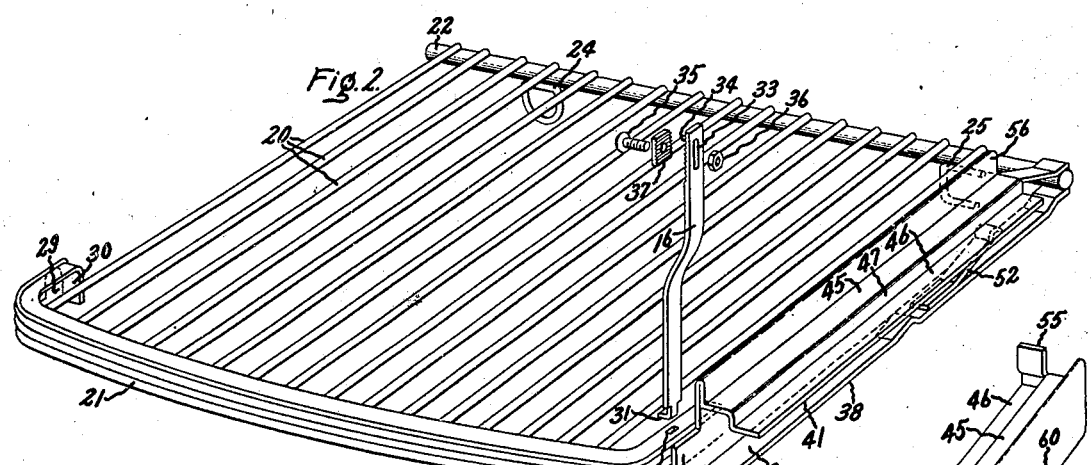
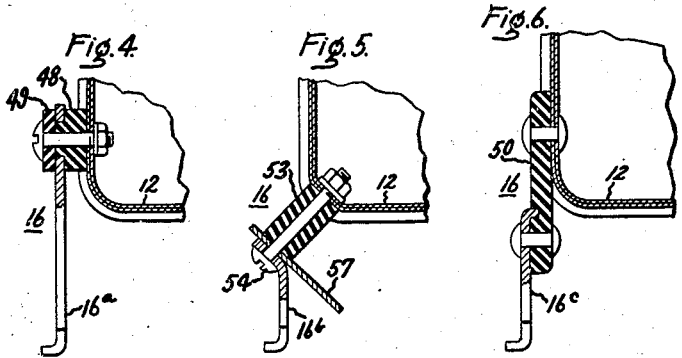
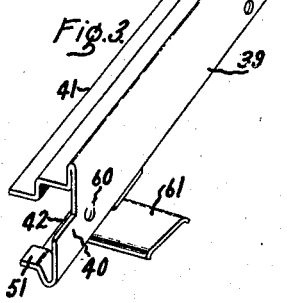
Inventor:
George C. Harbison
by Harry E. Dunham
His Attorney.

Patented Oct. 6, 1942

2,298,052

UNITED STATES PATENT OFFICE 2,298,052

REFRIGERATOR

George C. Harbison, Erie, Pa., assignor to General Electric Company, a corporation of New York Application January 29, 1941, Serial No. 376,491

2 Claims. (Cl. 62—89)

My invention relates to refrigerators and more particularly to food supporting devices especially adapted for use in domestic refrigerators.

The objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a partial front elevational view of a refrigerator cabinet equipped with my invention; Fig. 2 is an enlarged perspective view of the shelf shown in Fig. 1; Fig. 3 is an enlarged perspective view of one of the meat pan supports shown in Fig. 1; and Figs. 4, 5 and 6 are enlarged views illustrating different embodiments of a detail of my invention.

Referring to the drawing, I have shown a portion of a household refrigerator 10 having a heat insulated refrigerated compartment 11 adapted to be cooled by an evaporator or cooling element 12. There is disposed below the cooling element a food supporting device such as a meat pan or receptacle 13 and between the receptacle and the side wall 14 there is provided a food supporting device in the form of a shelf 15. At the righthand front corner of the shelf, as viewed in the drawing, there is provided a supporting member or hanger 16 engaging the shelf at its lower end and secured to the cooling element at the upper end thereof. In order to minimize the formation of frost on the member 16 I provide that member with means for minimizing the transfer of heat between the member and the cooling element. In one form of my invention, the member is made of relatively small cross section and is formed of a material having relatively poor heat conductivity characteristics. I have found that stainless steel is well suited for this purpose and, in addition, is relatively corrosion- and rust-proof and provides a pleasing appearance, especially when all the interior hardware is of the same material.

In Figs. 4, 5, and 6 of the drawing, there is illustrated the interposition of a material having relatively poor heat-conducting characteristics between the cooling element and a portion of the supporting member associated therewith. Another form of my invention comprises forming a portion of the supporting member of relatively poor heat-conducting material.

The provision of a supporting member, as described above, is further advantageous because sagging of the shelf and storage receptacle is eliminated, making it feasible to use lightweight article-supporting surfaces or devices.

Describing my invention in greater detail, I have provided a refrigerator cabinet having suitable heat insulated walls defining a food storage compartment, an access opening thereto being closed by a suitable heat insulated door 17. In order to cool the air within the storage compartment, I have provided an evaporator or cooling element 12 which may be of any conventional type. Inasmuch as the refrigerating apparatus may be conventional, the details of the refrigerant circulating system have not been illustrated. In the arrangement illustrated in the drawing, the cooling element is disposed at one side of the compartment and is provided with a door 18 closing the front end thereof. A handle 19 is provided to facilitate operation of the door.

The meat pan or storage receptacle 13 is disposed below and adjacent to the cooling element while the shelf 15 is positioned between the meat pan and a wall of the compartment. The shelf comprises a generally rectangularly shaped food supporting portion comprising longitudinally extending members 20 joined at the front and rear by transverse members 21 and 22, respectively, suitably secured to the members 20, as by welding, for example. The front member 21 is illustrated as being curved, is substantially L-shaped in cross section and is extended around the corners in order to provide a pleasing appearance. The shelf is supported from the inner liner 23 at the rear thereof by means of a loop 24 and hook-shaped member 25 depending from the transverse member 22 and suitably secured thereto as by welding. The loop 24 is constructed to engage a stud 26 projecting outwardly from the rear wall of the liner and the hook-shaped member 25 is adapted to engage a headed stud 27 suitably secured to the rear wall of the liner, as illustrated in Fig. 1. The front lefthand corner of the shelf is supported from a headed stud 28 suitably attached to the side wall 14 of the inner liner, the stud 28 engaging a suitable opening 29 in the side wall of the front member 21 near the end thereof. The opening 29, if desired, may be formed by cutting away the vertically extending portion of the member 21 at the end thereof and bending downwardly the end of the horizontal portion as indicated by the numeral 30.

The remaining corner of the shelf is supported by the hanger or supporting member 16. The hanger 16 is provided at the lower end with a hook-shaped portion 31 arranged and constructed for insertion through an opening or slot 32 in the upper surface of the transverse member 21 of the shelf. The other end of the hanger is arranged to be attached to the side wall of the evaporator. As best seen in Fig. 2, there is provided a longitudinally extending slot or opening 33 near the upper end of the member 16. The outer surface, that is, the surface facing away from the evaporator, is serrated, as indicated by the numeral 34, at the upper end in the vicinity of the slot. The hanger is assembled to the evaporator by means of a screw or other suitable fastening means 35 extending through the slot 33. The fastening means 35 may be arranged to engage the evaporator in any suitable manner. In the illustrated form of my invention, a nut 36 is provided, although the particular means is no part of my invention and the threaded member 35 may, if desired, engage a suitably tapped opening in the wall of the cooling element. In order to provide for vertically adjusting the position of the hanger and, therefore, the corner of the shelf, I have provided a washer 37 having its inner face serrated to correspond with the serrations 34 in the outer surface of the supporting element or hanger 16.

In the form of my invention illustrated in Figs. 1 and 2, the article supporting member 16 is made of material having relatively poor heat conducting characteristics as previously described.

In Fig. 4, I have shown a construction in which a member 16a is attached to the evaporator 12, heat insulating means being interposed between the evaporator or cooling element and the end of member 16 associated therewith. This means as illustrated in Fig. 4 comprises a spacer element 48 between the member 16a and the cooling element having a reduced portion extending through a suitable opening in the end of the member 16a. The parts are held in assembled relationship by means of a heat insulating washer 49 and suitable fastening means as a nut and bolt, for example.

In Fig. 5, there is illustrated a modification of the arrangement shown in Fig. 4. In this arrangement I have provided a heat insulating spacer element 53 interposed between the cooling element 12 and the upper end of a hanger element 16b by means of suitable fastening means as a bolt 54 and a nut, for example. If desired, two threaded members could be used instead of the single bolt 54, each of the bolts engaging suitable tapped openings in the ends of the member 53. If a bolt 54 extending entirely through the member 53 is provided, it is preferable that the bolt be formed of a relatively poor heat conducting material but inasmuch as the exposed portions of the bolt are relatively small there will be little tendency for frost to collect on the supporting member 16 comprising the hanger member 16b and the spacer member 53, no matter what the material utilized. Beneficial results are obtained even though a heat conducting path is present if that path is relatively long and of relatively small cross-section and the exterior surface is covered with material which is a relatively poor heat conductor. If it is desired to provide a drip guiding means, suitable washers or guiding members 57 may be provided so that any drip water running down the side of the cooling unit and element 53 will be directed into the drip tray or other receptacle for the drip water.

Fig. 6 illustrates another arrangement in which a relatively poor heat conductor is interposed or provided at some portion of the supporting means 16. In this construction the hanger or supporting member 16 comprises a lower portion 16c and an upper portion 50, the latter being formed from a material having relatively poor heat conducting characteristics, as, for example, hard rubber or one of the resinous products such as those known under the trade names "Bakelite," "Textolite," etc. The supporting member 16 may be assembled in any suitable manner and the supporting member may be attached to the cooling element in any suitable manner as by riveting, for example.

In order to support the receptacle or pan 13, I have provided a pair of spaced-apart similarly formed but oppositely disposed slide members 38 and 39, respectively. The slide members are preferably formed of sheet metal and are formed in such a way as to provide a vertical portion 40 and upper and lower flanges 41 and 42, respectively, for supporting the cover member 43 and the lower food supporting member 44, respectively, of the meat pan. As illustrated in the drawing, the slide member 38 is suitably secured to the transverse member 21 as by welding, for example. At the rear end, the flanges 41 and 42 are extended and shaped for engagement with the rear transverse member 22 and may be attached thereto in any suitable manner as by welding. The slide member 39 is supported from the side wall of the liner as by means of standoffs 58 and threaded fastening members 59 extending through suitable openings 60 in the member 39 and standoffs 58 into engagement with suitable threaded openings in the liner. I have illustrated the use of a bracket 61 suitably secured to the underside of the member 39 which may be used for the retention of a tool or lever for breaking the bond between ice trays and the evaporator surfaces.

The upper flange 41 is bent or formed in such a way as to provide vertically spaced-apart ledges 45 and 46, respectively, joined by a vertical portion 47. As best seen in Fig. 1, the cover member 43 of the meat pan is arranged so that it can be inverted to serve as a drip tray during defrosting of the cooling element. The cover member 43 is shaped so that the marginal rim engages the upper ledge 45 in the food storage position while the ledges 46 support the cover inverted. The lower member 44 of the meat pan is supported at the front end thereof by a raised portion 51 of the lower flange 42 and near the rear thereof by means of spring members 52 suitably secured to the flange 42 in any suitable manner as by welding. The free end of the springs 52 engage the underside of the rim or flange of the receptacle member 44. When there is no food contained in the receptacle, the springs will hold the member 44 in its highest position but when food is stored within the receptacle, the weight thereof will depress the springs 52 in proportion to the load and, therefore, vary the size of the air gap between the flanges or rims of the members 43 and 44 of the meat pan, respectively, at the rear thereof, and, therefore, the amount of ventilation provided between the inside of the receptacle and the refrigerated compartment 11. This variable support is not a part of my invention but is the invention of George S. Hill, and is described and claimed in application Serial No. 298,964, filed October 11, 1939, and assigned to the same assignee as the present invention.

In order to prevent accidental withdrawal of the receptacle from the slide members, I may provide a stop depending from a flange of the member 44 and arranged to engage the support portion 51 at a predetermined point in the forward movement of the receptacle. The rearward movement of the cover portion 43 is limited by the upstanding stop 55 suitably secured to the rear end of the upper flange 45. The stop 55 may, of course, be integral with the slide member. The rearward movement of the lower portion 44 of the receptacle may be limited by an upstanding stop which may be integral with the lower flange 42 at the rear end thereof. Lateral movement of the receptacle member 44 is limited by the vertical walls 40 of the slide members. Sidewise movement of the cover, when used in its normal position, is limited by the upwardly extending flange 56 of the slide members and, when used in the defrosting position, by the vertical portion 47 of the upper flange 45.

In the drawing there is illustrated a small shelf 62 supported from the evaporator or cooling element which is vertically adjustable to one of two positions. The shelf is provided with two upwardly extending loops 63 and a downwardly extending loop 64. In the upper position of the shelf, illustrated in Fig. 1, the shelf rests on the studs 65 extending outwardly from the rear wall of the liner, the loop 64 engaging one of the studs. The front edge of the shelf is supported from the cooling element by means of a laterally extending portion 66 having an opening therein arranged for engagement with the hook-shaped portion 67 of the support 68 secured to the cooling element. In the lower position of the shelf 62, the loops 63 engage the studs 65 and the portion 66 of the shelf engages the hook-shaped portion 69 of the support 68.

Modifications will occur to those skilled in the art. For example, the adjacent faces of the hanger 16 and the washer 37 may be arranged for any interlocking relationship which will permit vertical adjustment of the hanger, but prevent vertical movement therebetween when the fastening member is tightened to force the washer into engagement with the hanger. Accordingly, while I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. In a refrigerator cabinet having a food storage compartment, a cooling element disposed therein, a food storage receptacle disposed beneath said element and a shelf member arranged between the receptacle and a wall of the compartment, means for supporting the receptacle and the shelf member including a member associated at one end with the shelf and the receptacle and secured at the other end to the cooling element, said member being formed of a material having relatively poor heat conductivity characteristics.

2. In a refrigerator cabinet having a food storage compartment, a cooling element disposed therein, a food storage receptacle disposed beneath said element, and a shelf member arranged between the receptacle and a wall of the compartment, means for supporting the receptacle and the shelf member including a hanger member associated at one end with the shelf and the receptacle, the other end thereof having a longitudinally extending opening, means for fastening the hanger member to the cooling element comprising a fastening member extending through the opening into engagement with the cooling element, and a washer disposed between the fastening means and the hanger member, the adjacent faces of said hanger member and said washer being arranged and constructed for interlocking engagement whereby vertical movement therebetween is prevented when said fastening member is tightened to force the washer into engagement with the hanger member.

GEORGE C. HARBISON.